United States Patent

[11] 3,630,719

| [72] | Inventor | Robert C. Craig<br>Morristown, N.J. |
|---|---|---|
| [21] | Appl. No. | 811,849 |
| [22] | Filed | Apr. 1, 1969 |
| [45] | Patented | Dec. 28, 1971 |
| [73] | Assignee | Chemical Construction Corporation<br>New York, N.Y. |

[54] METHOD OF OPERATING A CUPOLA FURNACE
4 Claims, 1 Drawing Fig.

[52] U.S. Cl...................................................... 75/43,
50/90, 75/41
[51] Int. Cl................................................ C21b 11/02
[50] Field of Search........................................... 75/33, 40,
41, 43, 44; 266/17

[56] References Cited
UNITED STATES PATENTS
3,499,264 3/1970 Ekman........................ 75/43 X

*Primary Examiner*—L. Dewayne Rutledge
*Assistant Examiner*—J. Davis
*Attorney*—J. L. Chaboty ABSTRACT: The formation of an explosive gas mixture in the operation of a ferrous metallurgical furnace such as a vertical cupola furnace or the like is prevented, by injecting an inert gas stream into the upper part of the furnace below the charge inlet, to prevent air from flowing into the upper part of the furnace through the charge inlet, and thereby preventing the formation of an explosive gas mixture of air with process gas, which is rich in carbon monoxide and is withdrawn from the side of the furnace below the upper charge inlet.

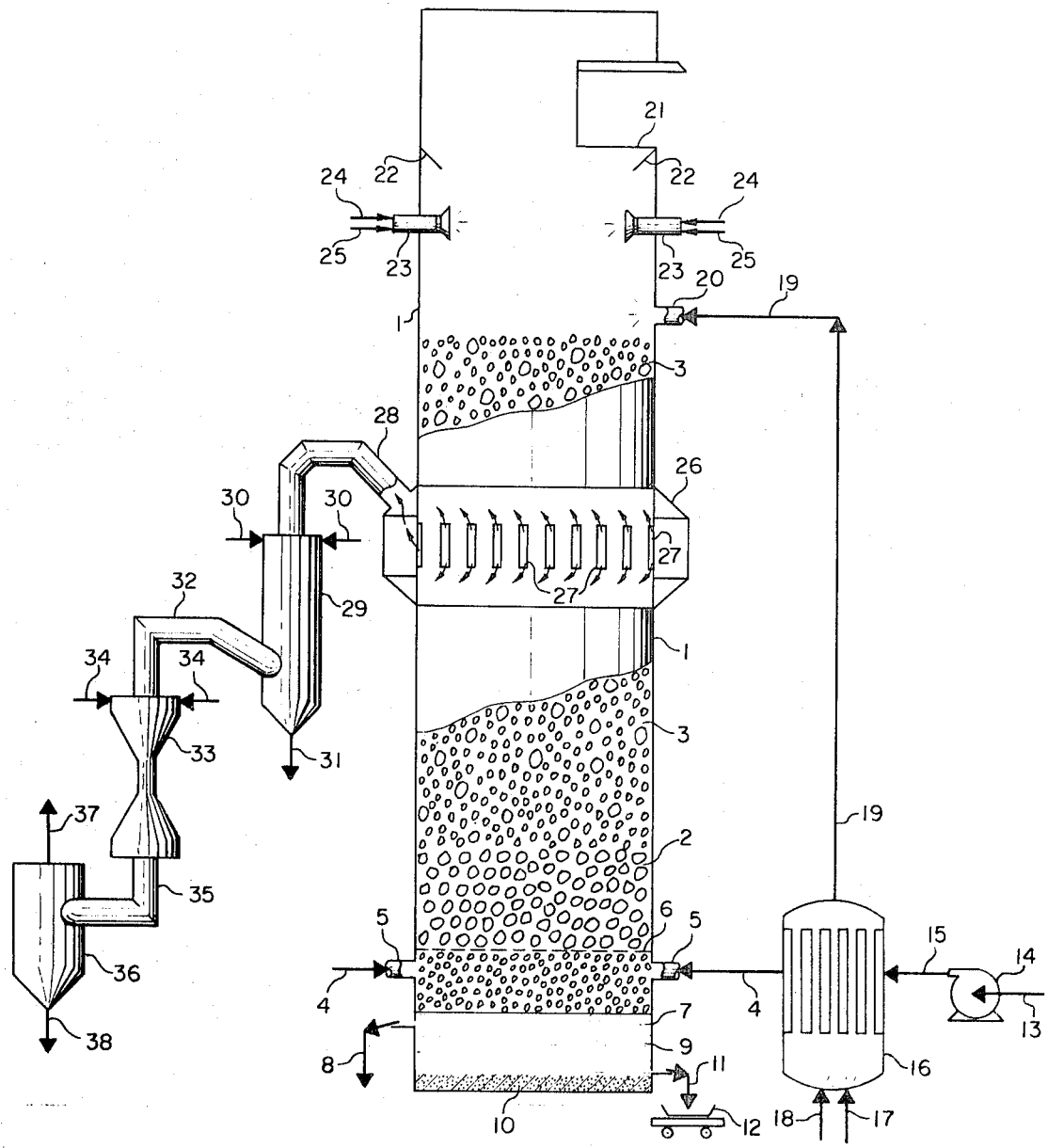

METHOD OF OPERATING A CUPOLA FURNACE

BACKGROUND OF THE INVENTION

1. Field of the Invention

The invention relates to the operation of vertically oriented cupola furnaces or similar ferrous metallurgical furnaces, in which a charge mixture of iron, coke and limestone is heated by an upward blast of air through a lower hot coke bed, which melts the iron and produces molten ferrous metal and slag in the bottom of the furnace. The molten metal and slag are tapped from the bottom of the furnace, and a process gas stream rich in carbon monoxide, which is generated in the furnace by the reaction of the air blast with coke and other reactants, is withdrawn from the upper part of the furnace and scrubbed with water or otherwise treated for the removal of entrained solid particles prior to discharge to the atmosphere. During the operating period, additional solid charge portions consisting of a mixture of iron, coke and limestone are added to the furnace through an upper charge inlet.

2. Description of the Prior Art

In the earliest practice of operating vertical cupola foundries and the like, the hot process gas stream formed by the process was discharged to the atmosphere, usually through an outlet at the top of the furnace. This process gas stream contained entrained solid particles of iron, and iron oxide fume, as well as solid particles of coke and limestone dust. Development in recent years of air pollution control regulations and restrictions has caused a curtailment in the operation of such simple cupola furnaces, and has necessitated the development of improved cupolas in which the generated process gas stream is treated for solids removal prior to discharge to the atmosphere. In current practice it is common to remove the generated solids-laden process gas rich in carbon monoxide from the side of the cupola below the level of the upper charge door, and generally below the level of the top of the charge in the cupola. The process gas is generally removed via an annular bustle, and is then passed to a spray quencher or other quenching device, followed by scrubbing of the gas stream with water or an aqueous liquid scrubbing agent to remove entrained solid particles. The scrubbed and clean gas stream may now be safely discharged to atmosphere, or in some cases this gas may now be employed as a fuel gas.

In the normal operation of a cupola equipped with a below charge takeoff system for process gas removal and emission control, ventilation air is drawn in through the upper charge door, which is provided so that additional charge portions consisting of a mixture of iron, coke and limestone may be dumped into the top of the main process charge or bed within the cupola during the operating cycle. The ventilation air drawn in through the charge door is carefully ratioed to the carbon monoxide-rich blast gases to prevent the formation of an explosive mixture, which could cause explosions in the downstream gas quenching and scrubbing systems. Under certain conditions of reduced capacity operations, on startup after standby operation, or on various emergency shutdowns, it is possible to upset the desired ratio and form an explosive mixture. Although the gas treating system downstream is usually provided with rupture discs, any explosion has the potential to do serious damage.

Numerous cupola furnace arrangements and off-gas treating systems have been suggested in the prior art. Among these may be mentioned the methods and devices of U.S. Pat. Nos. 2,746,858; 2,919,185; 3,186,830; 2,804,295; 2,796,341; 2,761,671 and 2,805,143.

Summary of the Invention

In the present invention, inert gas is injected into or formed in situ within the upper portion of the cupola furnace, below the charge door but above the cupola stockline or bustle through which the process off-gas is withdrawn. Within the context of the present invention, the term inert gas refers to a gas or gas mixture of depleted or negligible content of free or uncombined oxygen, and includes a gas or gas mixture substantially free of uncombined oxygen. In most instances, the inert gas is a combustion effluent or flue gas, formed by the combustion of a fuel with air. Due to the fact that the inert gas to be employed is essentially devoid of free oxygen, when it flows downwards through the upper portion of the cupola and mixes with the hot process off-gas stream, an explosive gas mixture cannot form in the cupola or its appurtenances such as the gas quenching and scrubbing systems. Thus, the provision of an inert gas in the upper portion of the cupola inhibits or prevents the induction of air into the upper portion of the cupola through the charge door.

In a preferred embodiment of the invention, burners are provided in the periphery of the stack below the upper charge door, but preferably above he cupola charge or stock line and in any case above the off-gas takeoff bustle or other off-gas outlet. The stoichiometric combustion of natural gas or any suitable fuel in the burners provides an inert gas blanket above the cupola stockline. The inert gases are drawn down into the bustle in lieu of air, thus no explosive mixtures can form in the emission control system, which usually consists of a gas quencher and wet scrubber as described supra. Appropriate controls may be provided to vary the firing rate of the burners to produce sufficient inert gas to meet required conditions. As a secondary benefit, the hot inert gases preheat the cupola charge. This preheat reduces the required blast and effects an economy in coke consumption.

The primary advantage of the present invention is that the entry of air into the upper portion of the cupola furnace through the upper charge door is effectively prevented, which thus prevents the mixing of inducted air with the process off-gas withdrawn from the cupola through a side bustle or the like. Therefore, the formation of explosive gas mixtures in cupola operation and the treatment of the off-gases from cupola furnaces is effectively prevented. Another advantage, when the injected inert gas is initially formed in situ or injected at an elevated temperature, is that the upper portion of the cupola charge is preheated by the downflowing inert gas stream, which reduces the requisite amount of blast air and effects an economy in coke consumption in the overall cupola operation.

It is an object of the present invention to provide an improved method of operating cupola furnaces or the like.

Another object is to prevent the formation of explosive gas mixtures in the operation of cupola furnace or the like, and their appurtenances.

An additional object is to prevent the induction of air into a cupola furnace through the upper charge door of the furnace.

A further object is to prevent the mixing or addition of air into the hot process off-gas rich in carbon monoxide generated by a cupola furnace or the like ferrous melting furnaces.

Still another object is to prevent the formation of explosive gas mixtures of process off-gas and air in the gas scrubbing appurtenances or other emission control systems of a cupola furnace or the like.

These and other objects and advantages of the present invention will become evident from the description which follows.

DESCRIPTION OF THE DRAWING AND PREFERRED EMBODIMENTS

Referring now to the drawing, a preferred embodiment of the present invention as applied to a cupola furnace for the melting of scrap iron or the like is illustrated.

The generally vertically oriented cylindrical cupola furnace 1 is provided with a lower internal bed 2 consisting primarily of coke, above which is disposed an upper internal bed 3 consisting generally of a mixture of iron, limestone and coke, and in most instances the iron component of bed 3 consists of scrap iron or the like. A hot-blast air stream 4, generally produced at a temperature in the range of about 200° C. to 500° C. as will appear infra, is passed via inlets 5 into unit 1 below lower grid or grate 6, which permits upward flow of the blast air into the beds 2 and 3 in series. The hot blast air rises through the hot or incandescent coke bed 2 and reacts with the coke to generate a highly elevated temperature, due to exothermic reaction of the oxygen component of the air with coke which forms carbon monoxide. The resulting hot process gas stream formed in bed 2 at a temperature generally in the range of 300° C. to 1,000° C., and principally containing carbon monoxide and nitrogen, rises through bed 3 and causes a reaction between the components in bed 3 with the resultant formation of small liquid droplets and streams consisting of molten ferrous metal and slag. The molten metal and slag flow downwards through grate 6, and the slag component collects as an upper molten pool or layer stream 7, which is periodically or continuously tapped from unit 1 via an upper taphole or the like as stream 8, which is cooled or quenched and passed to suitable slag disposal. The molten ferrous metal collects in the bottom of unit 1 as the lower liquid layer 9, which accumulates above sand bed 10, which may be provided in some cases to protect a bottom spent charge outlet door, now shown. The molten ferrous metal pool or layer stream 9 is periodically or continuously tapped from unit 1 via a lower taphole or the like as stream 11, which may be poured into a suitable mold or transfer vessel 12, which transfers the molten ferrous metal to finish casting or the like for the production of cast iron or other ferrous composition products.

The hot-blast air stream 4 is formed by passing ambient air stream 13 through fan or blower 14, with the resultant discharge air stream 15 passing external to the tubes of gas-to-gas heat exchange air preheater 16. A suitable fluid hydrocarbon fuel stream 17, which may consist of natural gas, methane, other gaseous hydrocarbons such as propane or butane, or a normally liquid hydrocarbon or hydrocarbon fraction such as crude oil, Bunker C residual oil, fuel oil or the like, is passed together with combustion air stream 18 into the lower part of unit 16. The combustion of stream 17 with stream 18 serves to generate a high temperature gas stream, which rises through the tubes of unit 16 and preheats the ambient air stream 15 by indirect heat exchange to form stream 4.

The combustion gas stream formed in unit 16 by the reaction of streams 17 and 18 is generally at an initial elevated temperature in the range of about 300° C. to 700° C., and the cooled resulting flue gas stream 19 discharged from unit 16 above the heat exchange tubes is now at a lower elevated temperature typically in the range of about 200° C. to 500° C. Stream 19 is a flue gas derived from the combustion of a suitable hydrocarbon fuel stream 17, and therefore stream 19 will have a reduced and essentially negligible content of free oxygen, and will principally contain carbon monoxide, carbon dioxide, water vapor and nitrogen. Stream 19 is now partially or totally employed in accordance with the concepts of the present invention, by passing stream 19 into unit 1 via inlet 20, which is disposed above the top of bed 3 and below the upper charge inlet 21, which is an opening which may be provided with a suitable door or the like, and through which additional charge portions are passed to join bed 3 via a suitable bucket or the like. The injection of stream 19 via inlet nozzle or pipe 20 serves to fill the upper portion of unit 1 with inert gas, and thus prevents the inflow of air into unit 1 via opening 21, which may be provided with a suitable skirt 22 or the like, to direct the downwards flow of additional charge portions dumped into unit 1 via opening 21. Instead of airflow downwards through the upper portion of unit 1 and bed 3, the hot flue gas stream 19 fills the upper portion of unit 1 and flows downwards through the upper portion of bed 3, and thereby preheats bed 3 to some extent, as well as preventing air entry via opening 21. Additional or alternative inert gas portions may be provided by disposing the plurality of hydrocarbon fuel burners 23 in the upper portion of unit 1 between bed 3 and opening 21, and passing fluid hydrocarbon fuel stream 24 and combustion air stream 25 to each of the burners 23. Streams 24 may be similar to stream 17 described supra. The combustion of streams 24 in the upper portion of unit 1 serves to generate additional hot inert gas or a gas of reduced oxygen content, generally below about 5 percent by volume, in the upper portion of unit 1, and the resulting hot inert flue gas, generally at an initial temperature in the range of about 200° C. to 500° C., flows downwards in unit 1 and preheats the upper portion of bed 3.

An annular process gas offtake bustle 26 is provided external to unit 1, and bustle 26 is generally disposed in the middle section of unit 1 opposite to bed 3, although in some cases bustle 26 may be disposed above the upper end of bed 3. In any case, hot process off-gas portions are removed from within unit 1 and flow into bustle 26 via a plurality of openings 27 in the wall of unit 1. The hot process gas withdrawn into bustle 26 from openings 27 will principally consist of process gas generated by the upwards gaseous flow of process blast air through beds 2 and 3, which is converted to a hot gaseous mixture principally containing carbon monoxide and nitrogen as described supra. In addition, the hot process gas withdrawn into bustle 26 via openings 27 will also contain an inert gas component derived from the downwards flow of inert gas admitted via 20 and/or formed in situ by combustion burners 23. Thus, the hot process gas formed in bustle 26 is essentially of a nonexplosive character and composition, and contains a negligible content of free oxygen. In most cases, the process gas in bustle 26 will essentially be devoid of free oxygen.

In any case, the hot process gas is withdrawn from bustle 26 at a temperature typically in the range of 300° C. to 800° C. via gas outlet duct 28, which passes the hot process gas to solids emission control appurtenances. The hot process gas stream initially flows from duct 28 into gas quencher 29, which is provided with quench water streams 30, which are sprayed or otherwise dispersed into the hot gas to provide a quench-cooling effect and cool the gases to a reduced temperature typically in the range of 50° C. to 90° C., prior to scrubbing for total solids removal. Warmed quench water is removed from unit 29 via lower stream 31, which may contain entrained solids removed from the gas stream during direct contact quenching. The cooled gas stream now flows via duct 32 to a suitable solids removal device, which typically consists of a venturi gas scrubbing device 33. Scrubbing liquid streams 34 are passed into the venturi scrubber, either above or within the converging section, or at the venturi throat, and gas-liquid contact takes place between the highly accelerated high velocity gas stream and the scrubbing liquid, at the venturi throat. The scrubbing liquid streams 34 generally consist of water or an aqueous solution. The resulting mixed gas-liquid stream formed in unit 33 passes via duct 35 into entrainment separator 36, which is a suitable baffled or cyclonic means or device or the like, for separating entrained liquid droplets from a gas stream. The scrubbed gas stream 37, now essentially free of entrained solids and liquid droplets, is passed from unit 36 to atmospheric discharge via a stack or the like, or stream 37 may be periodically or continuously utilized as a fuel gas or for other purposes. The separated scrubbing liquid phase containing entrained and dissolved solid particles is removed from unit 36 via stream 38, which may be passed to a settling or filtration device, not shown, prior to recycle of liquid via streams 34.

Numerous alternatives within the scope of the present invention, besides those mentioned supra, will occur to those skilled in the art. Unit 1 may be a cupola furnace or any similar ferrous metallurgical facility, which is intermittently charged from above with continuous withdrawal of hot process gas containing carbon monoxide. Streams 4 may consist of essentially ambient air in some cases, in which case unit 16 and its function may be omitted, with all of the inert gas blanket in the upper part of unit 1 being provided by burners 23. In this case, stream 15 would not be preheated but instead stream 15 would pass directly to unit 1 via inlets 5, and streams 17, 18 and 19 would be omitted. In instances when bustle 26 is disposed above the level of bed 3, or bed 3 terminates below bustle 26, which may be due to interruptions in makeup charge addition via opening 21, the hot inert gas would not flow through the upper portion of bed 3 to provide a preheat effect, but instead would flow directly into bustle 26 form unit 1. The preheat of bed 3 would also not take effect when an inert gas of suitable composition but of ambient or reduced temperature, such as nitrogen per se, is employed and passed into the upper portion of unit 1 via inlet pipe 20. Units 29 and 33 may be replaced in suitable instances by any suitable functionally equivalent devices, thus in some cases unit 33 could be replaced by an electrostatic precipitator or the like. In this case, unit 36 and its function would be omitted.

An example of an industrial application of the method of the present invention will now be described.

EXAMPLE

The method of the present invention was applied to an iron-producing cupola furnace, with five burners similar to unit 23 being provided, and with natural gas as the fuel to the burners. At the high fire rate of 900 C.F.M. natural gas to the burners, the peak temperature generated in the upper portion of the cupola was 440° C., well below the 590° C. ignition temperature of coke. At the low fire rate of 100 C.F.M. natural gas, a ventilation of 3000 ACFM was provided, which also produced sufficient combustion products at the high fire rate to supply the induced draft fan with the blast shut off. A ferrous melt of 28.5 TPH was produced from a charge of 37.5 TPH which contained by weight, 76 percent iron, 11 percent slagging component and 13 percent coke. The burndown from charge door to bustle was about 20 minutes.

I claim:

1. In the method of operating a cupola furnace or the like in which a vertically oriented furnace is provided with a lower charge bed principally consisting of coke, a process charge bed containing coke, iron and limestone above said lower coke charge bed, and an upper inlet for addition of further process charge; said lower coke charge bed is ignited; a stream of air is passed upwards through said furnace, whereby said air stream burns a portion of said coke bed and forms a hot process gas stream containing carbon monoxide which rises through said process charge bed and thereby heats and reacts with said process charge bed and melts said iron; the resulting molten ferrous metal and slag are withdrawn from the bottom of said furnace; said process gas stream containing carbon monoxide is withdrawn from a gas outlet opening in the side of said furnace below said upper inlet; and the withdrawn process gas stream is discharged external to said furnace; the improvement which comprises burning a fluid hydrocarbon fuel with air within said furnace above said process charge bed and between said upper inlet and said gas outlet opening, whereby a hot inert gas stream of low uncombined oxygen content is formed within said furnace above said process charge bed and between said upper inlet and said gas outlet opening, said inert gas stream being withdrawn from said furnace through said gas outlet opening together with said process gas stream, whereby said process gas stream withdrawn from said gas outlet opening contains said inert gas stream and is a nonexplosive gas mixture, and whereby the flow of air down through said furnace from said upper inlet is substantially prevented.

2. The method of claim 1, in which said process charge bed extends upwards in said furnace and terminates above said gas outlet opening, whereby said hot inert gas stream flows downwards through the upper portion of said process charge bed and thereby heats said upper process charge bed portion to an elevated temperature, prior to the reaction of said hot process gas stream with said process charge bed.

3. The method of claim 1, in which said air stream passed upwards through said furnace is a hot air stream which is preheated to a temperature in the range of 200° C. to 500° C.

4. The method of claim 1, in which said hot inert gas stream is substantially free of uncombined oxygen.

* * * * *